United States Patent
Kim et al.

(10) Patent No.: US 11,799,553 B2
(45) Date of Patent: Oct. 24, 2023

(54) APPARATUS AND METHOD OF GENERATING TERAHERTZ SIGNAL USING DIRECTLY-MODULATED LASER

(71) Applicant: ELECTRONICS AND TELECOMMUNICATIONS RESEARCH INSTITUTE, Daejeon (KR)

(72) Inventors: Eon-Sang Kim, Daejeon (KR); Sang Rok Moon, Daejeon (KR); Minkyu Sung, Seoul (KR); Seung-Hyun Cho, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/695,346

(22) Filed: Mar. 15, 2022

(65) Prior Publication Data
US 2022/0303017 A1    Sep. 22, 2022

(30) Foreign Application Priority Data

Mar. 17, 2021  (KR) .................. 10-2021-0034668

(51) Int. Cl.
 *H04B 10/50* (2013.01)
 *H04B 10/079* (2013.01)
 *H04B 10/69* (2013.01)
(52) U.S. Cl.
 CPC ....... *H04B 10/504* (2013.01); *H04B 10/0797* (2013.01); *H04B 10/6911* (2013.01)

(58) Field of Classification Search
 CPC .............. H04B 10/504; H04B 10/0797; H04B 10/6911; H04B 10/90; H01S 5/0262; H01S 5/0078; H01S 2302/02
 (Continued)

(56) References Cited

U.S. PATENT DOCUMENTS

| 3,957,441 A | 5/1976 | Baba et al. |
| 5,687,261 A * | 11/1997 | Logan .................... H04B 10/50 385/11 |

(Continued)

FOREIGN PATENT DOCUMENTS

| CN | 101188460 B | * | 7/2010 | |
| CN | 107749562 B | * | 5/2021 | ........... H01S 5/0424 |

(Continued)

*Primary Examiner* — Abbas H Alagheband
(74) *Attorney, Agent, or Firm* — LRK PATENT LAW FIRM

(57) ABSTRACT

Provided are an apparatus and method of generating a terahertz (THz) signal using a directly-modulated laser. An apparatus of generating a THz signal includes a first directly-modulated laser configured to output a local oscillator (LO) signal, a second directly-modulated laser configured to receive a baseband signal used as data and optically modulate the baseband signal, a band-pass filter configured to filter a spectral component of the baseband signal optically modulated and outputted through the second directly-modulated laser by using a specific frequency bandwidth, a coupler configured to couple the baseband signal filtered through the band-pass filter and the LO signal to each other, and a uni-travelling-carrier photodiode (UTC-PD) configured to generate a THz signal by beating the baseband signal and the LO signal coupled to each other.

13 Claims, 5 Drawing Sheets

(58) Field of Classification Search
USPC .......................................................... 398/197
See application file for complete search history.

(56) References Cited

U.S. PATENT DOCUMENTS

| | | | | |
|---|---|---|---|---|
| 7,092,645 | B1 * | 8/2006 | Sternowski | H04B 10/25759 |
| | | | | 398/204 |
| 7,539,221 | B1 * | 5/2009 | Jiang | H01S 3/0675 |
| | | | | 372/12 |
| 10,082,627 | B2 | 9/2018 | Park et al. | |
| 2002/0145796 | A1 * | 10/2002 | Kikuchi | H04B 10/291 |
| | | | | 359/341.33 |
| 2003/0189745 | A1 * | 10/2003 | Kikuchi | H04B 10/5051 |
| | | | | 359/237 |
| 2014/0061475 | A1 * | 3/2014 | Ryu | G01B 11/06 |
| | | | | 250/339.06 |
| 2017/0294925 | A1 * | 10/2017 | Fazal | H04B 1/0007 |

FOREIGN PATENT DOCUMENTS

| | | | | |
|---|---|---|---|---|
| EP | 3422606 A1 * | 1/2019 | ........... | H04B 10/504 |
| EP | 3422606 B1 * | 11/2021 | ........... | H04B 10/504 |
| JP | 2007101319 A * | 4/2007 | | |
| JP | 4505403 B2 | 4/2010 | | |
| KR | 10-0342429 B1 | 7/2002 | | |
| KR | 10-0519050 B1 | 10/2005 | | |
| KR | 10-1170271 B1 | 8/2012 | | |
| WO | WO-2022045402 A1 * | 3/2022 | | |

* cited by examiner

APPARATUS AND METHOD OF GENERATING TERAHERTZ SIGNAL USING DIRECTLY-MODULATED LASER

CROSS-REFERENCE TO RELATED APPLICATION

This application claims the benefit of Korean Patent Application No. 10-2021-0034668 filed on Mar. 17, 2021, in the Korean Intellectual Property Office, the entire disclosure of which is incorporated herein by reference for all purposes.

BACKGROUND

1. Field of the Invention

One or more example embodiments relate to a next-generation light-based wireless transmission system for delivering bulk mobile traffic, and more particularly, to an apparatus and method of generating a terahertz (THz) signal using a low-cost directly-modulated laser.

2. Description of Related Art

Interest in a technology to evolve into beyond 5G or 6G for transmission of bulk wireless data traffic at a rate of tens of Gb/s or more beyond a 5G mobile communication system and network currently in commercialization progress is growing throughout the world. Among numerous candidate technologies for transmission of bulk traffic, a communication technology using a THz band capable of using a bandwidth of tens to hundreds of GHz is drawing attention. Specifically, a light-based THz signal transmission system uses a mature optical communication technology to have advantages of enabling bulk data transmission and a flexible system configuration, and thus results of many researches using the advantages are being published.

A representative light-based THz signal generator generates a THz signal having a frequency ($f_{THz}=|f_1-f_2|$) corresponding to a difference of frequencies of two different light sources ($f_1$, $f_2$) through an optical beating process to which an optical heterodyne technique is applied. In this case, components such as a laser, an optical modulator, an optical comb generator, and the like used as light sources for bulk transmission require a high cost, consume a large amount of power, or have a large size, and thus greatly affect the simplification and initial cost of the light-based THz signal transmission system.

Components such as an external cavity laser, an external modulator (for example, Mach-Zehnder modulator), and the like used as light sources for beating to generate a THz signal use a broadband characteristic of a device, and thus have an advantage of bulk transmission. However, an additional apparatus for monitoring and controlling a driving condition of the external modulator is required, and thus there is an issue such as an increase in the initial cost and complexity of the THz signal transmission system.

In addition, when the optical comb generator is configured to generate a THz signal, an RF synthesizer, an optical amplifier, and an arrayed waveguide grating (AWG) optical filter are required, and thus there are issues such as a complicated configuration and an increase in cost.

SUMMARY

Example embodiments provide an apparatus and method of generating a THz signal, and more particularly, provide an apparatus and method capable of simplifying a configuration of a THz signal generating apparatus and reducing a cost for installation and maintenance by using a directly-modulated laser.

According to an aspect, there is provided an apparatus of generating a THz signal, the apparatus including a first directly-modulated laser configured to output a local oscillator (LO) signal, a second directly-modulated laser configured to receive a baseband signal used as data and optically modulate the baseband signal, a band-pass filter configured to filter a spectral component of the baseband signal optically modulated and outputted through the second directly-modulated laser by using a specific frequency bandwidth, a coupler configured to couple the baseband signal filtered through the band-pass filter and the LO signal to each other, and a uni-travelling-carrier photodiode (UTC-PD) configured to generate a THz signal by beating the baseband signal and the LO signal coupled to each other.

The band-pass filter may have a frequency bandwidth for suppressing a spectral component corresponding to a long wavelength among spectral components of the baseband signal.

The UTC-PD may be configured to generate the THz signal having a frequency corresponding to a frequency difference between the baseband signal and the LO signal.

The apparatus may further include an optical amplifier configured to optically amplify the baseband signal and the LO signal coupled to each other through the coupler, and the UTC-PD may be configured to generate the THz signal by using the baseband signal and the LO signal optically amplified through the optical amplifier.

According to another aspect, there is provided a method of generating a THz signal, the method including outputting, through a first directly-modulated laser, an LO signal, optically modulating, through a second directly-modulated laser, a baseband signal used as data, filtering, by using a band-pass filter having a specific frequency bandwidth, a spectral component of the baseband signal optically modulated through the second directly-modulated laser, coupling, through a coupler, the baseband signal filtered through the band-pass filter and the LO signal to each other, and generating, through a UTC-PD, a THz signal by beating the baseband signal and the LO signal coupled to each other.

The band-pass filter may have a frequency bandwidth for suppressing a spectral component corresponding to a long wavelength among spectral components of the baseband signal.

The UTC-PD may be configured to generate the THz signal having a frequency corresponding to a frequency difference between the baseband signal and the LO signal.

The method may further include optically amplifying, through an optical amplifier, the baseband signal and the LO signal coupled to each other through the coupler, and the UTC-PD may be configured to generate the THz signal by using the baseband signal and the LO signal optically amplified through the optical amplifier.

According to still another aspect, there is provided an apparatus of generating a THz signal, the apparatus including a first directly-modulated laser configured to output an LO signal, a second directly-modulated laser configured to receive a baseband signal used as data and optically modulate the baseband signal, a coupler configured to couple the baseband signal and the LO signal to each other, a band-pass filter configured to filter a spectral component of the baseband signal and a spectral component of the LO signal coupled to each other through the coupler by using a specific frequency bandwidth, and a UTC-PD configured to generate a THz signal by beating the filtered baseband signal and LO signal.

The band-pass filter may have a frequency bandwidth for passing a frequency band corresponding to the spectral component of the baseband signal and a frequency band corresponding to the spectral component of the LO signal.

The band-pass filter may have a frequency bandwidth for suppressing a spectral component corresponding to a long wavelength among spectral components of the baseband signal.

The UTC-PD may be configured to generate the THz signal having a frequency corresponding to a frequency difference between the baseband signal and the LO signal.

The apparatus may further include an optical amplifier configured to optically amplify the baseband signal and the LO signal filtered through the band-pass filter, and the UTC-PD may be configured to generate the THz signal by using the baseband signal and the LO signal optically amplified through the optical amplifier.

According to still another aspect, there is provided a method of generating a THz signal, the method including outputting, through a first directly-modulated laser, an LO signal, optically modulating, through a second directly-modulated laser, a baseband signal used as data, coupling, through a coupler, the baseband signal and the LO signal to each other, filtering, through a band-pass filter, a spectral component of the baseband signal and a spectral component of the LO signal coupled to each other through the coupler by using a specific frequency bandwidth, and generating, through a UTC-PD, a THz signal by beating the filtered baseband signal and LO signal.

The band-pass filter may have a frequency bandwidth for passing a frequency band corresponding to the spectral component of the baseband signal and a frequency band corresponding to the spectral component of the LO signal.

The band-pass filter may have a frequency bandwidth for suppressing a spectral component corresponding to a long wavelength among spectral components of the baseband signal.

The UTC-PD may be configured to generate the THz signal having a frequency corresponding to a frequency difference between the baseband signal and the LO signal.

The method may further include optically amplifying, through an optical amplifier, the baseband signal and the LO signal filtered through the band-pass filter, and the UTC-PD may be configured to generate the THz signal by using the baseband signal and the LO signal optically amplified through the optical amplifier.

Additional aspects of example embodiments will be set forth in part in the description which follows and, in part, will be apparent from the description, or may be learned by practice of the disclosure.

According to example embodiments, it is possible to simplify a configuration of a THz signal generating apparatus and reduce a cost for installation and maintenance by generating a THz signal using a directly-modulated laser.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
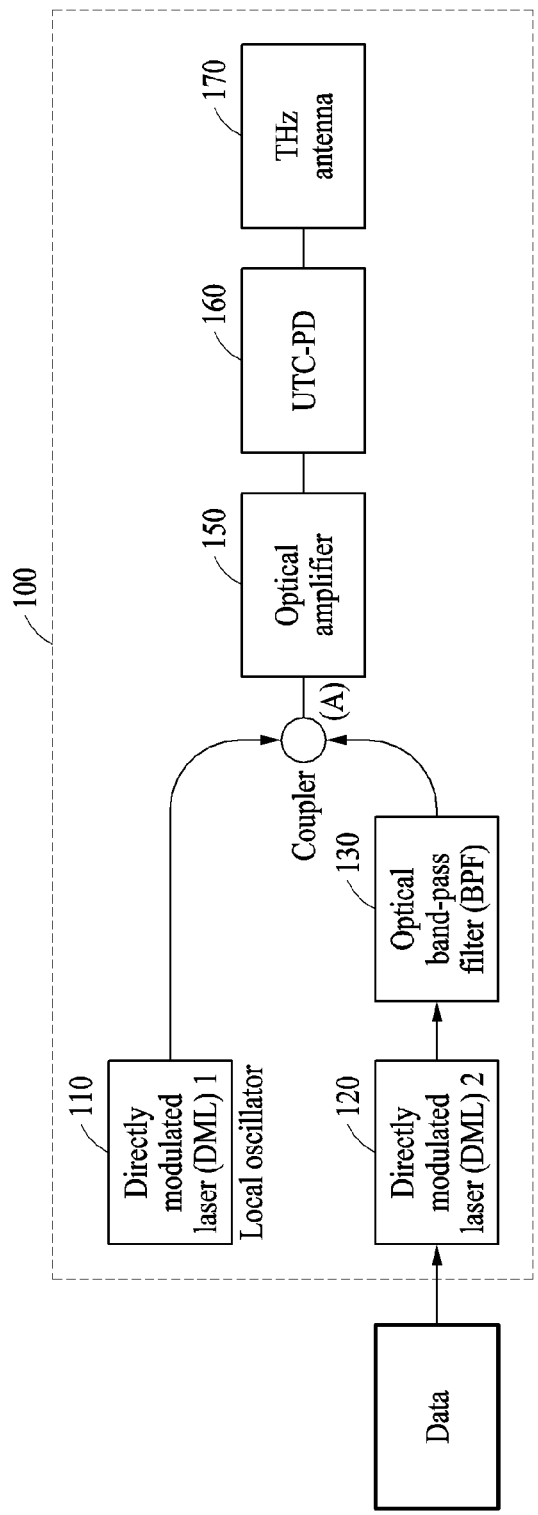
FIG. 1 is a diagram illustrating a THz signal generating apparatus using a directly-modulated laser according to a first example embodiment.

FIG. 1 is a diagram illustrating a THz signal generating apparatus using a directly-modulated laser according to a first example embodiment.

Referring to FIG. 1, a THz signal generating apparatus 100 according to example embodiments may generate a THz signal by using a directly-modulated laser, and improve transmission performance of the generated THz signal.

More specifically, the THz signal generating apparatus 100 may use two directly-modulated lasers having different wavelength characteristics so as to generate the THz signal through an optical beating process. For example, the THz signal generating apparatus 100 may output an LO signal by using a first directly-modulated laser 110, and optically modulate a baseband signal used as data by using a second directly-modulated laser 120.

Figure 2:
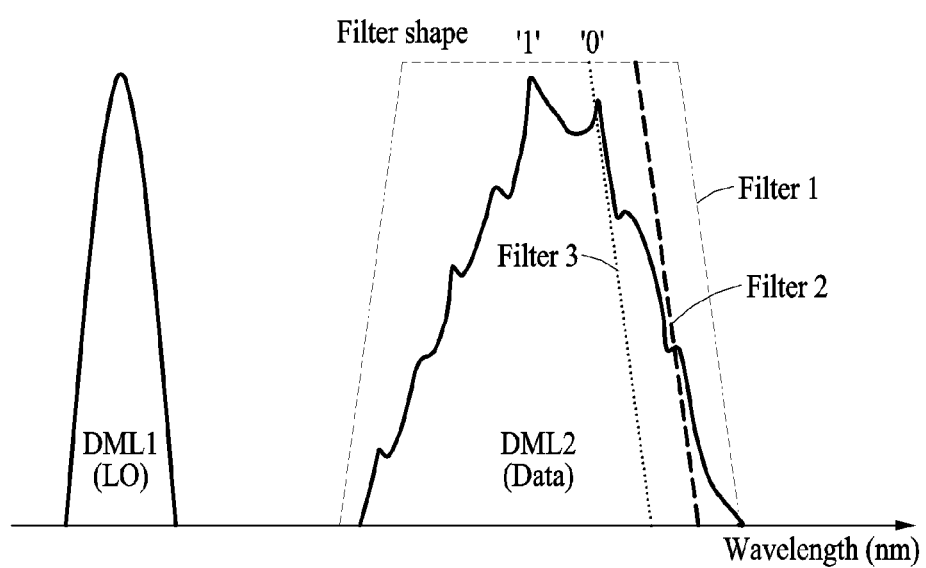
FIG. 2 is a diagram illustrating an optical signal spectrum at a point A according to the first example embodiment.

A light source directly modulated through the second directly-modulated laser 120 may have a broad-spectrum characteristic, as illustrated in FIG. 2, due to a spectrum broadening characteristic by an inherent chirp. Referring to FIG. 2, two peaks may appear in the light source directly modulated through the second directly-modulated laser 120. On the basis of a wavelength (frequency), a short wavelength (high frequency) may represent a component by a "1" level, and a long wavelength (low frequency) may represent a component by a "0" level.

In this case, a frequency interval between respective peaks may be fixed according to a data rate, and an optical extinction ratio may be determined according to an intensity difference between a "0" level signal and a "1" level signal of an electrical signal inputted into the second directly-modulated laser 120.

In other words, as a peak-to-peak intensity of a modulated signal (baseband signal used as data) inputted into the second directly-modulated laser 120 increases, an optical extinction ratio of the THz signal generating apparatus 100 may increase, thereby compensating for a degradation in performance due to an optical loss and noise caused by an optical fiber. However, there may be a limitation in a method of increasing the optical extinction ratio with the peak-to-peak intensity of the modulated signal.

The THz signal generating apparatus 100 according to example embodiments may provide a method of improving transmission performance of a THz signal by connecting an OBPF 130 to an output of the second directly-modulated laser 120, and increasing an optical extinction ratio by using an edge filtering characteristic of the OBPF 130.

To this end, the THz signal generating apparatus 100 may suppress a spectral component ("off" level energy) corresponding to the "0" level among outputs of the second directly-modulated laser 120 by using the OBPF 130, thereby increasing the optical extinction ratio. In this case, a change in the optical extinction ratio generated by optical filtering using the OBPF 130 may be represented by Equation 1 below.

$$\Delta\varepsilon = \Delta v(dL/dv) \qquad (1)$$

Here, $\Delta\varepsilon$ represents an amount of change of an optical extinction ratio, $\Delta v$ represents a frequency interval between a "0" level signal and a "1" level signal, and $dL/dv$ represents an insertion loss ratio of the OBPF 130 based on a frequency.

In other words, the THz signal generating apparatus 100 may increase an amount of removal of the spectral component corresponding to the "0" level so as to obtain a high optical extinction ratio. To this end, the THz signal generating apparatus 100 may move a central wavelength of the second directly-modulated laser 120 to a long wavelength band compared to a central wavelength of the OBPF 130, or move the central wavelength of the OBPF 130 to a short wavelength band compared to the central wavelength of the second directly-modulated laser 120 to increase the amount of removal of the spectral component corresponding to the "0" level, thereby obtaining a higher optical extinction ratio.

Thereafter, the THz signal generating apparatus 100 may couple an output of the first directly-modulated laser 110 that outputs an LO signal and an output of the second directly-modulated laser 120 with an optical extinction ratio increased by suppressing the spectral component corresponding to the "0" level to each other through the coupler 140.

The coupled outputs of the first directly-modulated modulated laser 110 and the second directly-modulated laser 130 with the increased optical extinction ratio may be amplified through an optical amplifier 150, and then may be inputted into a UTC-PD 160.

The UTC-PD 160 may generate a THz signal through an optical beating process of optical signals amplified and inputted through the optical amplifier 150, and the generated THz signal may be radiated to the outside through an antenna 170.

As described above, the THz signal generated through the THz signal generating apparatus 100 according to example embodiments may secure a wider eye, thereby compensating for a degradation in performance due to an optical loss and noise caused by an optical fiber.

In other words, the THz signal generating apparatus 100 according to example embodiments may increase a wireless transmission distance of the THz signal through an optical signal with an increased optical extinction ratio only by using a directly-modulated laser and an optical filter, which leads to a result such as increased coverage, thereby removing a shaded area where the THz signal is not capable of reaching indoors.

Figure 3A:
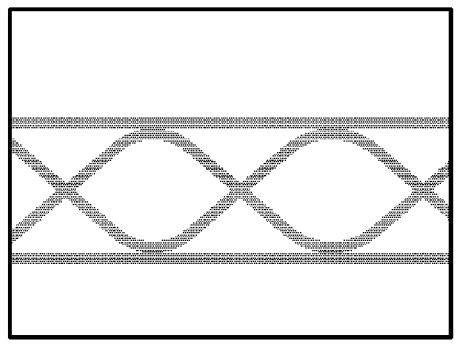
FIGS. 3A through 3C are diagrams illustrating a change in an optical extinction ratio based on a degree of filtering through an optical band-pass filter (OBPF) according to the first example embodiment.
Figure 3B:
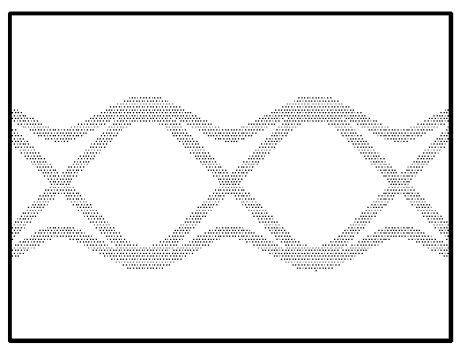
Figure 3C:
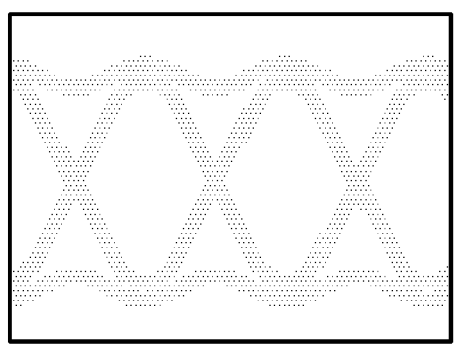

FIGS. 3A through 3C are diagrams illustrating a change in an optical extinction ratio based on a degree of filtering through an OBPF according to the first example embodiment.

Referring to FIGS. 3A through 3C, an optical extinction ratio based on a degree of filtering of a spectral component corresponding to a "0" level may be verified. When all spectral components for an output of the second directly-modulated laser 120 are included in the same manner as Filter 1 of FIG. 2, an eye diagram may be obtained as illustrated in FIG. 3A.

In this case, it can be verified that the "0" level is lowered to be close to the ground and the optical extinction ratio is increased as illustrated in FIGS. 3B and 3C as a degree of suppressing the spectral component corresponding to the "0" level increases in the same manner as Filter 2 and Filter 3 by adjusting a passband of the OBPF 130.

Figure 4:
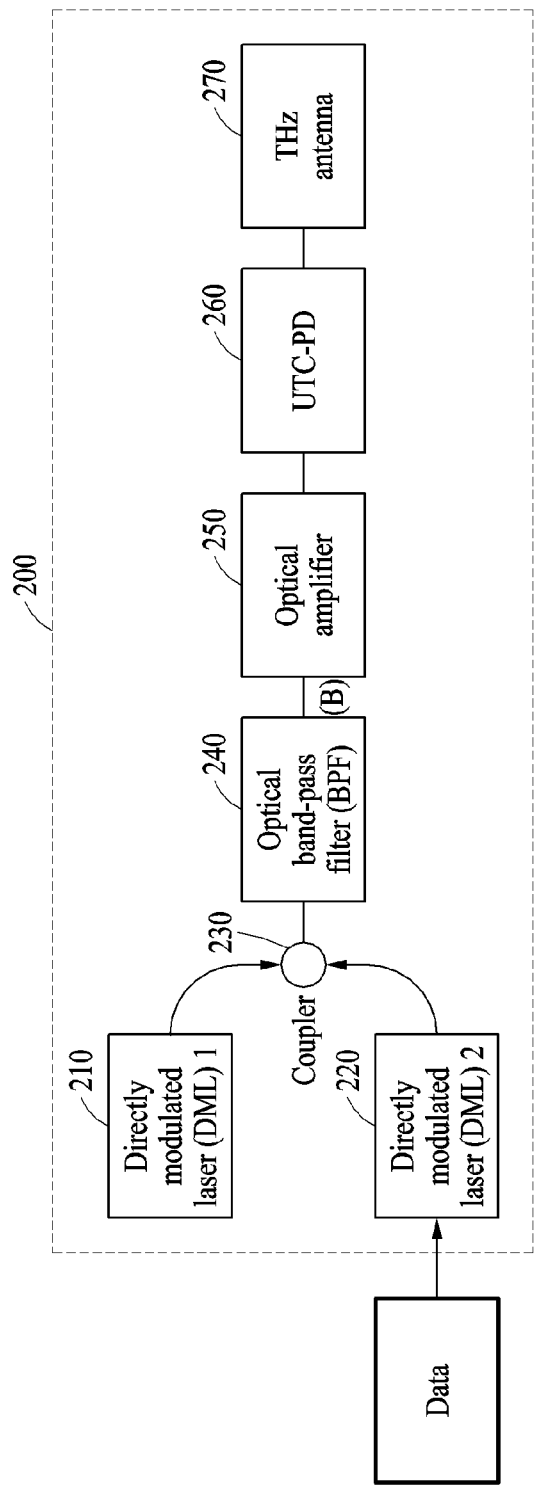
FIG. 4 is a diagram illustrating a THz signal generating apparatus using a directly-modulated laser according to a second example embodiment.

FIG. 4 is a diagram illustrating a THz signal generating apparatus using a directly-modulated laser according to a second example embodiment.

Referring to FIG. 4, a THz signal generating apparatus 200 according to example embodiments may generate a THz signal by using a directly-modulated laser, and improve transmission performance of the generated THz signal.

In this case, the THz signal generating apparatus 200 may be similar to the THz signal generating apparatus 100 illustrated in FIG. 1 in that the THz signal generating apparatus 200 includes a first directly-modulated laser 210 that outputs an LO signal, a second directly-modulated laser 220 that optically modulates a baseband signal used as data, a coupler 230, an OBPF 240, an optical amplifier 250, a UTC-PD 260, and an antenna 270.

However, the OBPF 240 may have an issue associated with difficulty in precisely controlling a center wavelength and an increase in cost, as a passband becomes smaller. Accordingly, the THz signal generating apparatus 200 may provide a structure using the lost-cost OBPF 240 with a large-sized passband that does not require precise control of the central wavelength.

Figure 5:
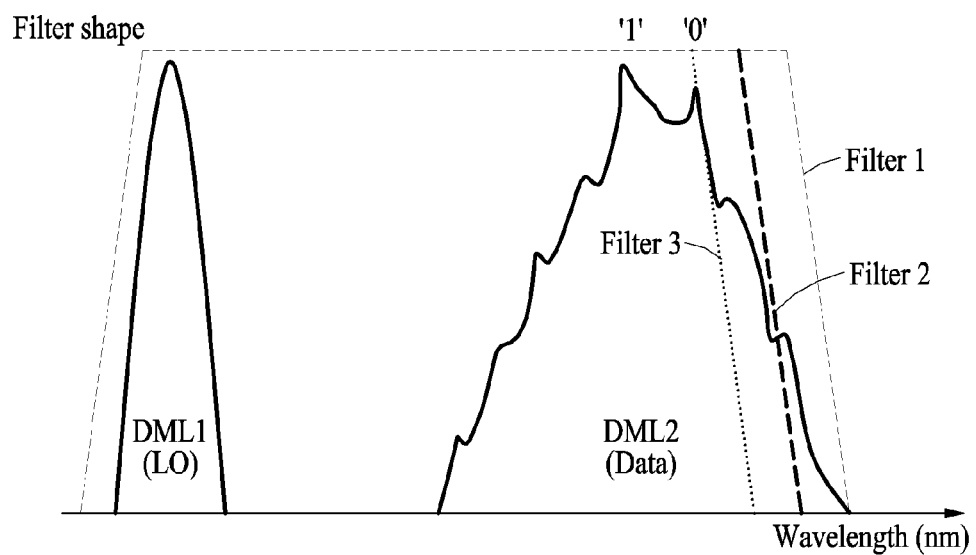
FIG. 5 is a diagram illustrating an optical signal spectrum at a point B according to the second example embodiment.

In this case, the OBPF 240 may be disposed at a rear end of the coupler 230, unlike the THz signal generating apparatus 100 illustrated in FIG. 1. As illustrated in FIG. 5, the OBPF 240 may have a passband sufficient to include both an output of the first directly-modulated laser 210 and an output of the second directly-modulated laser 220.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. An apparatus of generating a terahertz (THz) signal, the apparatus comprising:
    a first directly-modulated laser configured to output a local oscillator (LO) signal;
    a second directly-modulated laser configured to receive a baseband signal used as data and optically modulate the baseband signal;
    a band-pass filter connected to the second directly-modulated laser and configured to filter a part of spectral components of the baseband signal optically modulated and outputted through the second directly-modulated laser by using a specific frequency bandwidth to increase an optical extinction ratio by suppressing the part of spectral components which corresponds to an off-level energy among the spectral components outputted from the second directly-modulated laser;
    a coupler configured to couple the baseband signal filtered through the band-pass filter and the LO signal to each other; and
    a uni-travelling-carrier photodiode (UTC-PD) configured to generate a THz signal by beating the filtered baseband signal and the LO signal coupled to each other by the coupler,
    wherein the band-pass filter is provided between the second directly-modulated laser and the coupler.

2. The apparatus of claim 1, wherein the band-pass filter has a frequency bandwidth for suppressing a spectral component corresponding to a long wavelength among the spectral components of the baseband signal.

3. The apparatus of claim 1, wherein the UTC-PD is configured to generate the THz signal having a frequency corresponding to a frequency difference between the baseband signal and the LO signal.

4. The apparatus of claim 1, further comprising:
    an optical amplifier configured to optically amplify the baseband signal and the LO signal coupled to each other through the coupler,
    wherein the UTC-PD is configured to generate the THz signal by using the baseband signal and the LO signal optically amplified through the optical amplifier.

5. A method of generating a terahertz (THz) signal, the method comprising:
    outputting, through a first directly-modulated laser, a local oscillator (LO) signal;
    optically modulating, through a second directly-modulated laser, a baseband signal used as data;
    filtering, by using a band-pass filter having a specific frequency bandwidth and connected to the second directly-modulated laser, a part of spectral components of the baseband signal optically modulated through the second directly-modulated laser to increase an optical extinction ratio by suppressing the part of spectral components which corresponds to an off-level energy among the spectral components outputted from the second directly-modulated laser;
    coupling, through a coupler, the baseband signal filtered through the band-pass filter and the LO signal to each other; and
    generating, through a uni-travelling-carrier photodiode (UTC-PD), a THz signal by beating the filtered baseband signal and the LO signal coupled to each other by the coupler, wherein the band-pass filter is provided between the second directly-modulated laser and the coupler.

6. The method of claim 5, wherein the band-pass filter has a frequency bandwidth for suppressing a spectral component corresponding to a long wavelength among the spectral components of the baseband signal.

7. The method of claim 5, wherein the UTC-PD is configured to generate the THz signal having a frequency corresponding to a frequency difference between the baseband signal and the LO signal.

8. The method of claim 5, further comprising:
optically amplifying, through an optical amplifier, the baseband signal and the LO signal coupled to each other through the coupler,
wherein the UTC-PD is configured to generate the THz signal by using the baseband signal and the LO signal optically amplified through the optical amplifier.

9. An apparatus of generating a terahertz (THz) signal, the apparatus comprising:
a first directly-modulated laser configured to output a local oscillator (LO) signal;
a second directly-modulated laser configured to receive a baseband signal used as data and optically modulate the baseband signal;
a coupler configured to couple the baseband signal and the LO signal to each other;
a band-pass filter connected to the coupler and configured to filter a part of spectral components of the baseband signal and a spectral component of the LO signal coupled to each other through the coupler by using a specific frequency bandwidth to increase an optical extinction ratio by suppressing the part of spectral components which corresponds to an off-level energy among the spectral components outputted from the second directly-modulated laser; and
a uni-travelling-carrier photodiode (UTC-PD) configured to generate a THz signal by beating the filtered baseband signal and LO signal,
wherein the band-pass filter is provided between the coupler and the UTC-PD.

10. The apparatus of claim 9, wherein the band-pass filter has a frequency bandwidth for passing a frequency band corresponding to the spectral component of the baseband signal and a frequency band corresponding to the spectral component of the LO signal.

11. The apparatus of claim 10, wherein the band-pass filter has a frequency bandwidth for suppressing a spectral component corresponding to a long wavelength among the spectral components of the baseband signal.

12. The apparatus of claim 9, wherein the UTC-PD is configured to generate the THz signal having a frequency corresponding to a frequency difference between the baseband signal and the LO signal.

13. The apparatus of claim 9, further comprising:
an optical amplifier configured to optically amplify the baseband signal and the LO signal filtered through the band-pass filter,
wherein the UTC-PD is configured to generate the THz signal by using the baseband signal and the LO signal optically amplified through the optical amplifier.

* * * * *